INVENTOR.
Robert R. Wahrer
BY
Ooms, McDougall & Hersh
Attorneys

May 31, 1966 R. R. WAHRER 3,254,230

PEAK DETECTOR

Filed Nov. 24, 1961 3 Sheets-Sheet 2

INVENTOR.
Robert R. Wahrer

BY

Ooms, McDougall & Hersh
Attorneys

May 31, 1966 R. R. WAHRER 3,254,230

PEAK DETECTOR

Filed Nov. 24, 1961 3 Sheets-Sheet 3

INVENTOR.
Robert R. Wahrer
BY
Ooms, McDougall & Hersh
Attorneys

United States Patent Office 3,254,230

Patented May 31, 1966

3,254,230

PEAK DETECTOR

Robert R. Wahrer, Glenview, Ill., assignor to Cook Electric Company, Chicago, Ill., a corporation of Delaware Filed Nov. 24, 1961, Ser. No. 154,804

4 Claims. (Cl. 307—88.5)

This invention relates to electronic pulse circuits and pertains particularly to a new and improved peak detector for producing sharp pulses of extremely brief duration which are timed accurately to correspond with rounded peaks of input signals.

A further object is to provide a peak detector which will operate with a high degree of precision, despite wide variations in the amplitude and the wave form of the input signals.

Another object is to provide a new and improved peak detector of the foregoing character which is highly efficient yet is remarkably simple and trouble-free in construction.

Figure 1:
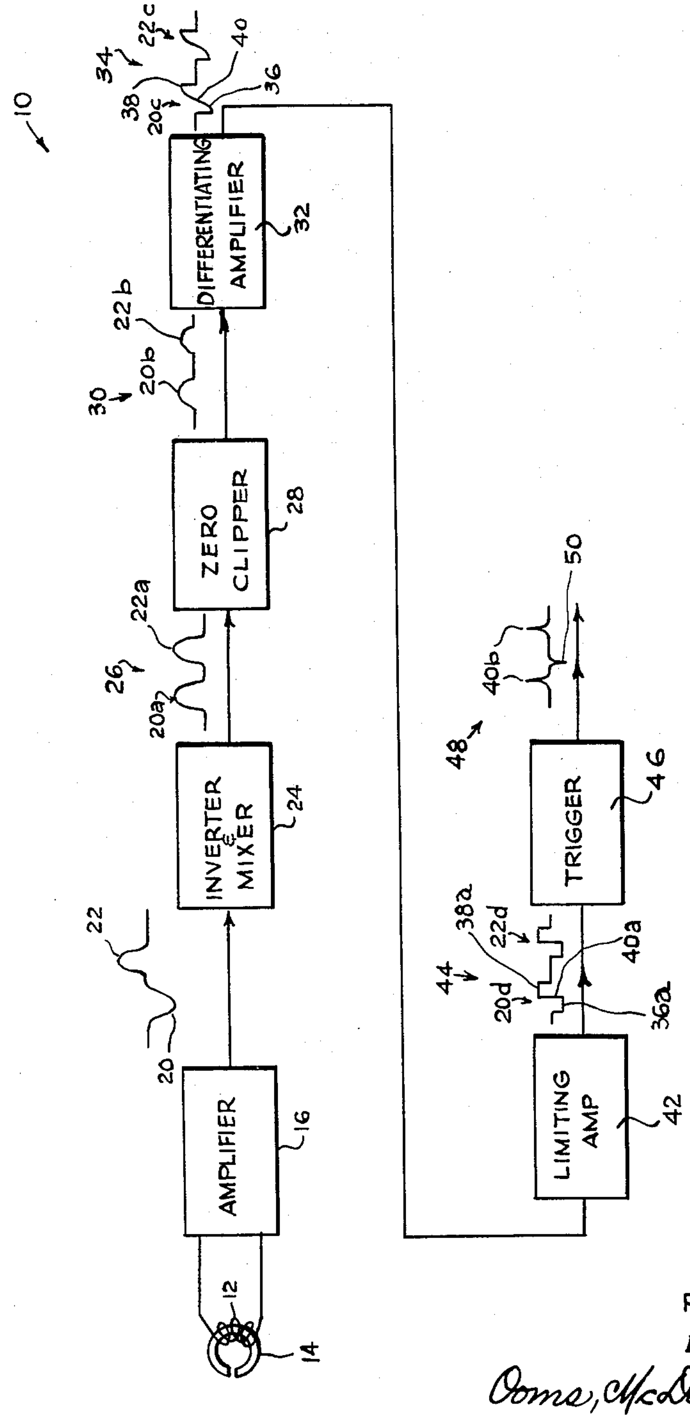

Further objects and advantages of the present invention will appear from the following description, taken with the accompanying drawings, in which:

FIG. 1 is a schematic block diagram of a peak detector to be described as an illustrative embodiment of the present invention.

Figure 2:
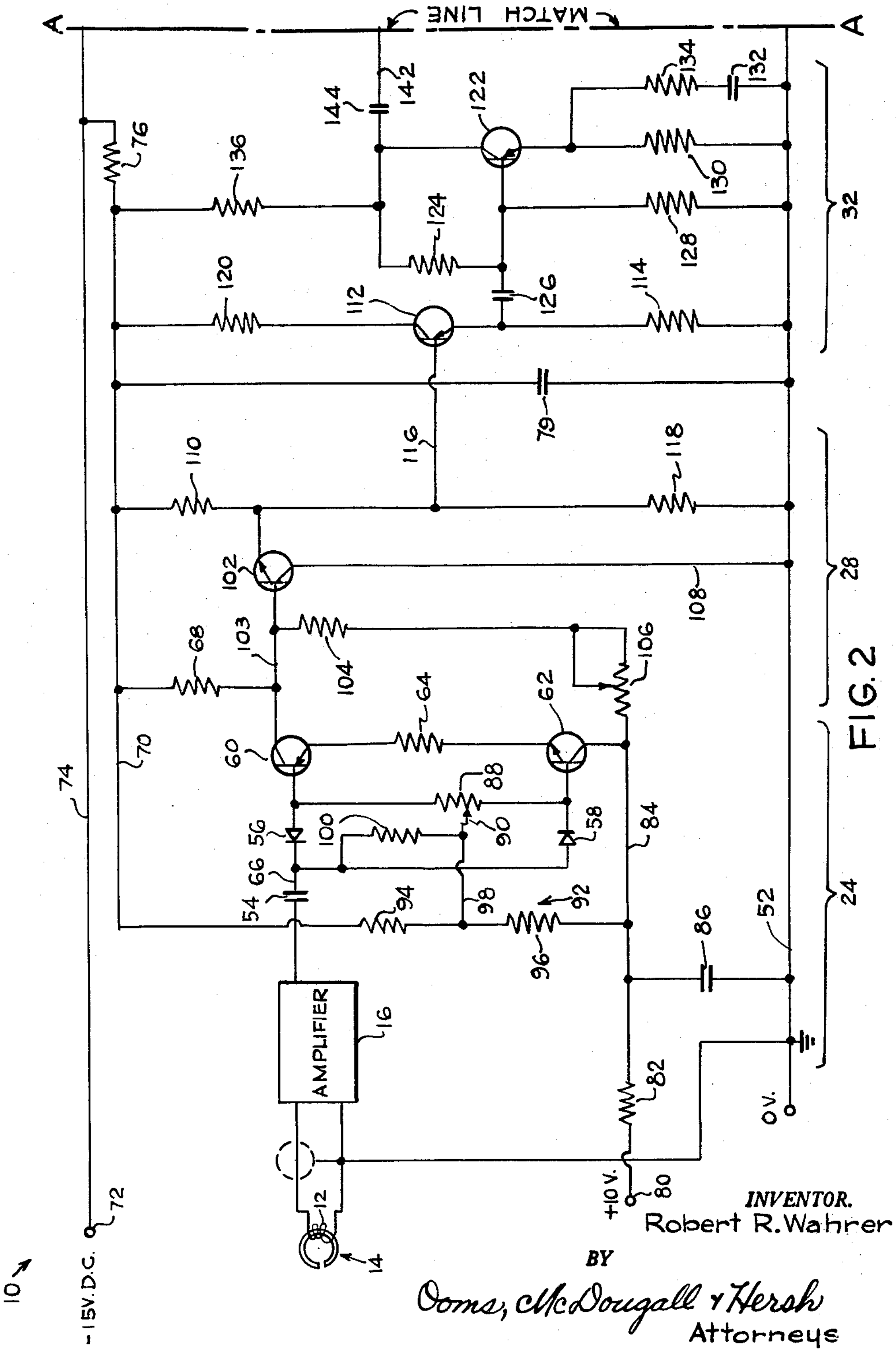
Figure 3:
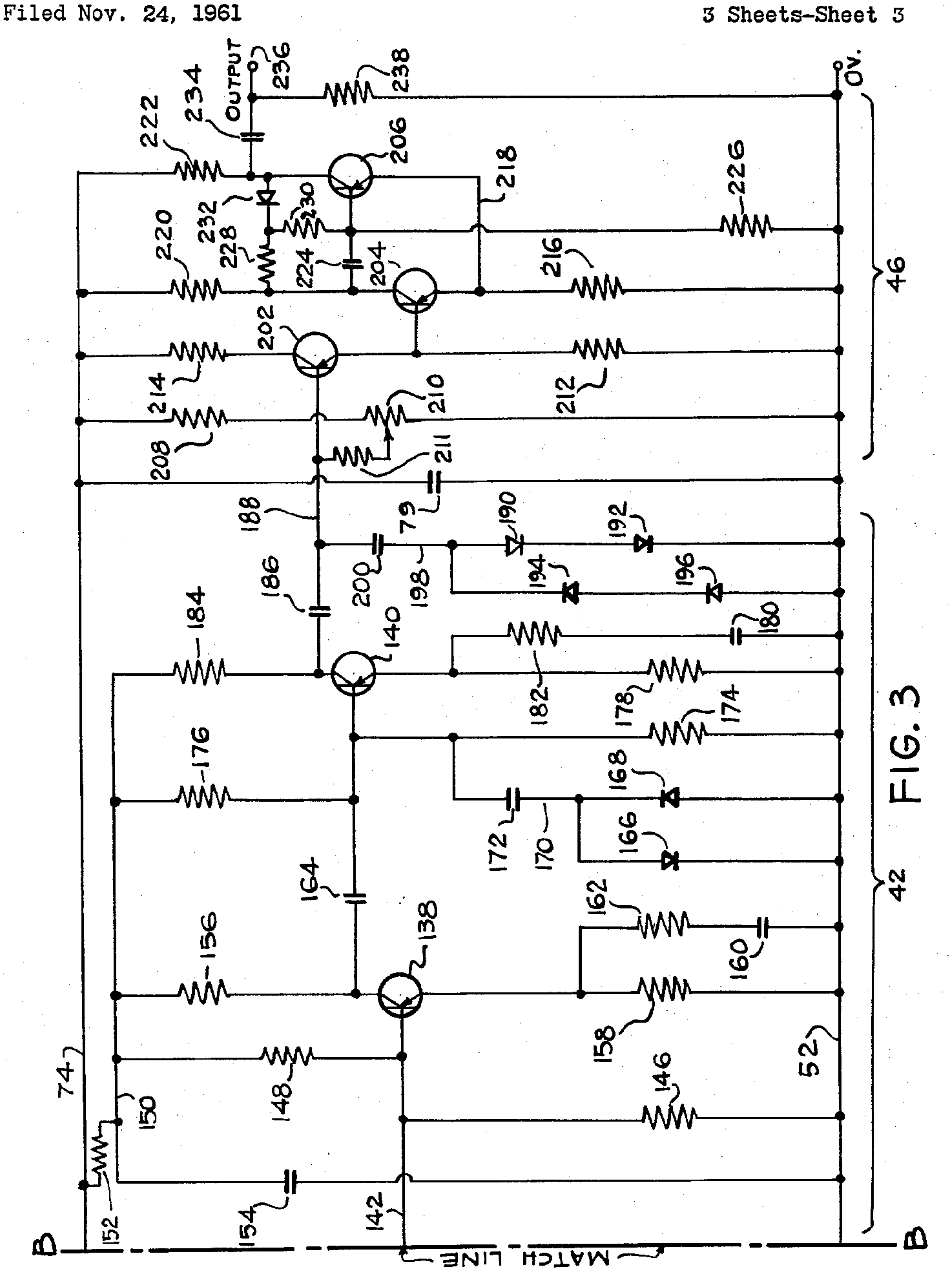

FIG. 2 and 3, taken together, constitute a schematic wiring diagram of the peak detector. These views are adapted to be arranged end to end, with the match line A—A in FIG. 2 overlying the match line B—B in FIG. 3.

The drawings illustrate a peak detector 10 which will find a variety of applications, but is especially useful in the handling of electronic data signals reproduced from magnetic recordings or other similar data storage facilities. When electronic data signals are reproduced from magnetic tape or other magnetic recordings, the signals tend to be in the form of rounded peaks rather than in the original or ideal form of sharp pulses of extremely brief duration. The peak detector 10 of the present invention is capable of producing sharp, brief pulses which are timed to correspond accurately with the rounded peaks of reproduced digital data signals, or other input signals. Such sharp pulses are ideally suited for operating subsequent data processing equipment.

The block diagram of FIG. 1 illustrates the general layout of the peak detector 10. In this case, the input signals are derived from a coil 12, which may be a pickup winding on a magnetic reproducing head 14, forming part of a machine for reproducing signals from magnetic tape or other recordings. An amplifier 16 is preferably employed to amplify the input signals. As indicated by the wave form diagram 18 adjacent the amplifier 16, the input signals include rounded peaks 20 and 22 which may correspond to digital pulse signals recorded on the magnetic tape. The reproduced peaks tend to be of rounded wave form, even though the original pulses were square and sharp.

It is preferred to invert or rectify the peaks of one polarity so that all of the peaks will be of the same polarity. Thus, the signals from the amplifier 16 are passed through a combination inverter and mixer 24 which produces rectified signals having the wave form shown in the diagram 26. As shown, the rectified signals have peaks 20*a* and 22*a*, corresponding to the peaks 20 and 22, but of the same polarity.

To remove low amplitude noise, it is preferred to pass the rectified signals through a zero clipper 28 which clips off all but the top portions of the peaks to produce a clipped signal having peaks 20*b* and 22*b*, as shown in the wave form diagram 30.

Next, the signals are passed through a differentiating device, which may be in the form of a differentiating amplifier 32. As shown in the wave form diagram 34, the amplifier 32 produces differentiated signals 20*c* and 22*c* corresponding to the slope or rate of change of the rounded peaks 20*b* and 22*b* It will be seen that each of the differentiated signals 20*c* and 22*c* comprises adjacent pulses 36 and 38 of opposite polarity, representing the increasing and decreasing portions of the rounded peaks 20*b* and 22*b*. A polarity reversal occurs between the pulses 36 and 38 at the point 40.

The peak detector is effective to produce a sharp, brief pulse corresponding to each polarity reversal 40. Thus, it is preferred to feed the differentiated signals 20*c* and 22*c* through a limiting or clipping amplifier 42 which produced output signals 20*d* and 22*d* having a substantially square wave form, as shown in the diagram 44. Each of the squared signals 20*d* and 22*d* comprises adjacent pulses 36*a* and 38*a* of opposite polarity, corresponding to the differentiated pulses 36 and 38. A polarity reversal 40*a* occurs between the pulses 36*a* and 38*a* and is synchronized with the polarity reversal 40.

A trigger circuit or device 46 may be employed to produce sharp pulses 40*b* of brief duration, corresponding to the polarity reversals 40*a*, as shown in the diagram 48. These sharp pulses 40*b* are ideally suited for operating subsequent data processing equipment. All of the pulses 40*b* are of the same polarity. The trigger device 46 may also produce other pulses 50 of the opposite polarity, corresponding to other portions of the signals 20*d* and 22*d*, but these pulses 50 are not significant because the subsequent data processing equipment may readily be arranged to be completely unresponsive to the pulses 50, because of their reverse polarity. Thus, the subsequent equipment may easily be arranged to be operated only by pulses of the polarity represented by the output pulses 40*b*. If desired, a suitable rectifier may be employed to remove the reverse pulses 50 from the output signal.

Further details of the peak detector 10 will be apparent from the schematic wiring diagram of FIGS. 2 and 3. These views should be laid end to end with the match line A—A in FIG. 2 lying over the match line B—B in FIG. 3.

As illustrated in FIG. 2, one side of the input coil 12 is connected to a ground lead 52, while the other side of the coil is connected to the input of the amplifier 16. A coupling capacitor 54 is connected between the output of the amplifier 16 and the combination inverter and mixer 24. As previously indicated, the inverter 24 rectifies or inverts the peaks of one polarity so that all of the peaks to be detected will be of the same polarity. Of course, it will not be necessary to employ the inverter if all of the peaks to be detected are already of the same polarity, or if only peaks of one polarity are to be utilized.

The inverter 24 employs oppositely polarized diode rectifiers 56 and 58. Suitable amplifying devices may also be employed to mix and amplify the rectified pulses. In this case, the amplifying devices are in the form of transistors 60 and 62. In order to effect the desired phase inversion, the transistors 60 and 62 are of oppositely polarized types. Thus, the transistor 60 is of the PNP type, while the transistor 62 is of the NPN type. The transistors 60 and 62 are arranged in series by connecting a resistor 64 between the emitters of the two transistors. In each case, the base of the transistor is employed as the input electrode. Thus, the capacitor 54 is connected between the output of the amplifier 16 and a lead 66. The diode 56 is connected between the lead 66 and the base of the transistor 60 and is polarized so that the negative peaks will be transmitted by the diode 56 to the transistor 60. Similarly, the diode 58 is connected between the lead 66 and the base of the transistor 62. The diode 58 is oppositely polarized so as to transmit the positive peaks to the transistor 62.

A load resistor 68 is connected between the collector of the transistor 60 and a negative power supply lead 70, which receives its negative voltage from a negative power supply terminal 72, through a lead 74 and a filter resistor 76. The terminal 72 may be supplied with a negative voltage of approximately 15 volts, with respect to the ground lead 52. A filtering capacitor 78 may be connected between the lead 70 and the ground lead 52. Similarly, a capacitor 79 may be connected between the power supply lead 74 and the ground lead 52. The collector of the transistor 60 may receive an additional operating voltage from a positive power supply terminal 80 through a filtering resistor 82 and a lead 84. The terminal 80 may be supplied with a positive potential of approximately 10 volts with respect to the ground lead 52. A filtering capacitor 86 may be connected between the lead 84 and the ground lead 52.

In the illustrated arrangement, a balancing potentiometer 88 is connected between the bases of the transistors 60 and 62. The potentiometer 88 has a slider 90 which is connected to a biasing circuit adapted to provide a bias voltage for the bases of the transistors 60 and 62. The illustrated network 92 comprises resistors 94 and 96 connected in series between the power supply lead 70 and the positive power supply lead 84. The junction of the resistors 94 and 96 is connected to the slider 90 by a lead 98. A load resistor 100 is connected between the leads 66 and 98.

As previously indicated, the rectified output from the mixing transistors 60 and 62 is fed through the zero clipper 28, which in this case comprises a transistor 102 of the NPN type. The transistor 102 is biased beyond cutoff so that only the positive peaks of the rectified signals from the transistors 60 and 62 are amplified by the transistor 102. The lower portions of the signals, nearer the zero level, are clipped off.

The clipping transistor 102 is coupled to the transistor 60 by a lead 103 which is connected directly between the collector of the transistor 60 and the base of the transistor 102. A resistor 104 and a variable resistor 106 are connected in series between the base of the transistor 102 and the power supply lead 84. The bias on the transistor 102 may be varied by adjusting the resistor 106.

A lead 108 is connected between the collector of the transistor 102 and the ground lead 52. A load resistor 110 is connected between the negative power supply lead 70 and the emitter of the transistor 102.

From the zero clipper 28, the signals pass to the differentiating amplifier 32. In this case, the amplifier 32 includes a driving transistor 112 which is connected as an emitter follower. Thus, a load resistor 114 is connected between the emitter of the transistor 112 and the ground lead 52. The base of the transistor 112 is directly connected to the emitter of the transistor 102 by means of a lead 116. To provide the proper bias on the transistor 112, a resistor 118 is connected between the base of the transistor 112 and the ground lead 52. A voltage dropping resistor 120 is connected between the negative power supply lead 70 and the collector of the transistor 112.

The differentiating amplifier 32 also comprises a transistor 122 connected as a feedback amplifier. Thus, a feedback resistor 124 is connected between the collector and the base of the transistor 122. The desired differentiating action is provided by a coupling capacitor 126 of small value, connected between the emitter of the transistor 112 and the base of the transistor 122. A base return resistor 128 is connected between the base of the transistor 122 and the ground lead 52.

It will be seen that a resistor 130 is connected between the emitter of the transistor 122 and the ground lead 52.

To bypass high frequency components of the signals, the resistor 130 is shunted by a capacitor 132 connected in series with a resistor 134. A load resistor 136 is connected between the negative power supply lead 70 and the collector of the transistor 122.

As previously indicated, the differentiated signal is squared off by the limiting amplifier 42, which in this case comprises two amplifying transistors 138 and 140 connected in cascade. A lead 142 extends from the base of the transistor 138. A coupling capacitor 144 is connected between the lead 142 and the collector of the transistor 122. It will be seen that a resistor 146 is connected between the base of the transistor 138 and the ground lead 52. To provide the proper bias for the transistor 138, a resistor 148 is connected between the base of the transistor 138 and a negative power supply lead 150 which is connected to the negative power supply lead 74 by a filtering resistor 152. A filtering capacitor 154 is connected between the lead 150 and the ground lead 52.

A load resistor 156 is connected between the power supply lead 150 and the collector of the transistor 138. It will be seen that a biasing resistor 158 is connected between the emitter of the transistor 138 and the ground lead 152. A bypassing action for high frequencies is provided by a capacitor 160 and a resistor 162, connected in series across the resistor 158.

As shown, a coupling capacitor 164 is connected between the collector of the transistor 138 and the base of the transistor 140. The desired limiting action is provided by a pair of oppositely polarized diode rectifiers 166 and 168, connected in parallel between a lead 170 and the ground lead 52. A capacitor 172 is connected between the base of the transistor 140 and the lead 170. The diodes 166 and 168 may be of a known type adapted to become conductive at voltages above a predetermined level, so as to provide the desired limiting action. Thus, for example, the diodes may be of the germanium type adapted to conduct at voltages above approximately 3/10 of a volt.

A resistor 174 is connected between the base of the transistor 140 and the ground lead 52. It will be seen that a biasing resistor 176 is connected between the negative power supply lead 150 and the base of the diode 140. An additional biasing resistor 178 is connected between the emitter of the transistor 140 and the ground lead 52. A bypassing action for high frequencies is provided by a capacitor 180 and a resistor 182 connected in series across the resistor 178.

It will be seen that a load resistor 184 is connected between the negative power supply lead 150 and the collector of the transistor 140. The output of the transistor 140 is taken through a coupling capacitor 186 connected between the collector and a lead 188.

A further limiting action is provided by diodes 190, 192, 194 and 196. It will be seen that the diodes 190 and 192 are connected in series between a lead 198 and the ground lead 52. The diodes 194 and 196 are also connected in series between the leads 198 and 52 but are polarized oppositely with respect to the diodes 190 and 192. A capacitor 200 is connected between the leads 188 and 198. The diodes 190, 192, 194 and 196 may be of the silicon type so that two of them in series will become conductive at voltages above approximately 1.4 volts. Thus, the diodes will limit the output of the amplifier to approximately this level.

As previously indicated, the square wave output from the limiting amplifier 42 is employed to operate the trigger device 46, which generates pulses corresponding accurately with the changes in polarity of the square wave. Those skilled in the art will be familiar with various trigger circuits which will be suitable for the present application. The illustrated trigger circuit 46 comprises a driving transistor 202 connected as an emitter follower, and two transistors 204 and 206 which are alternately conductive. The base of the transistor 202 is connected directly to the lead 188. An adjustable biasing voltage for the transistor 202 is provided by a resistor 208 and a variable potentiometer 210 connected in series between the negative power supply lead 74 and the ground lead 52. The slider of the potentiometer 210 is connected to the base of the transistor 202, through a resistor 211.

A load resistor 212 is connected between the emitter of the transistor 202 and the ground lead 52. It will be seen that a voltage dropping resistor 214 is connected between the negative power supply lead 74 and the collector of the transistor 202.

The base of the transistor 204 is connected directly to the emitter of the transistor 202. As shown, a mutual load or coupling resistor 216 is connected between the ground lead 52 and the emitters of the transistors 204 and 206, the emitters being connected together by a lead 218. A load resistor 220 is connected between the negative power supply lead 74 and the collector of the transistor 204. Similarly, a load resistor 222 is connected between the power supply lead 74 and the collector of the transistor 206.

In the present arrangement, a coupling capacitor 224 of small value is connected between the collector of the transistor 204 and the base of the transistor 206. A resistor 226 is connected between the base of the transistor 206 and the ground lead 52. Coupling resistors 228 and 230 are also connected in series between the collector of the transistor 204 and the base of the transistor 206. A limiting diode 232 is connected between the collector of the transistor 206 and the junction of the resistors 228 and 230.

The output of the trigger circuit 46 is taken through a coupling capacitor 234 connected between the collector of the transistor 206 and an output terminal 236. A resistor 238 is connected between the output terminal 236 and the ground lead 52. The capacitor 234 may be of small value so as to provide a differentiating or pulse sharpening action.

The transistor 204 may be normally conductive, while the transistor 206 is normally cut off. A positive-going signal at the base of the transistor 204 causes an abrupt reversal of this condition, so that the transistor 204 is cut off, while the transistor 206 is conductive. In this way, a sharp pulse or spike is generated between the output terminal 236 and the ground lead 52. When the signal at the base of the transistor 204 again goes negative, the original condition is abruptly restored so that the transistor 204 is again conductive, while the transistor 206 is cut off. This produces a pulse of the opposite polarity at the output terminal 236. The pulses of reverse polarity could be eliminated by the use of a rectifier, but this is normally unnecessary because the subsequent pulse handling equipment can readily be arranged to be responsive to pulses of one polarity only.

It will be evident that the output pulses are timed to correspond with the polarity reversals 40 and 40*a* of the differentiated signal and the squared-off signal from the limiting amplifier 42. The polarity reversals 40 and 40*a* coincide with the tops of the rounded peaks 20 and 22 of the input signals. Thus, the peak detector 10 provides sharp pulses or spikes which are timed accurately to correspond with the tops or centers of the input peaks. In this way, sharp narrow output pulses are provided while preserving the original timing of the rounded input pulses. The sharp pulses are ideally suited for operating subsequent data processing or pulse handling equipment, yet are precisely timed. Thus, the peak detector of the present invention is highly precise and efficient in operation.

Those skilled in the art will understand that various values may be assigned to the components of the illustrated peak detector. However, the following table of values will be of interest as embodying examples of suitable values:

*Resistors*

| Reference character: | Resistance in ohms |
|---|---|
| 64 | 680 |
| 68 | 2,200 |
| 76 | 82 |
| 82 | 27 |
| 88 | 10,000 |
| 94 | 6,800 |
| 96 | 1,500 |
| 100 | 47,000 |
| 104 | 2,700 |
| 106 | 5,000 |
| 110 | 2,700 |
| 114 | 1,000 |
| 118 | 1,800 |
| 120 | 820 |
| 124 | 4,700 |
| 128 | 2,700 |
| 130 | 1,000 |
| 134 | 100 |
| 146 | 5,600 |
| 148 | 18,000 |
| 152 | 220 |
| 156 | 2,200 |
| 158 | 1,200 |
| 162 | 220 |
| 174 | 5,600 |
| 176 | 18,000 |
| 178 | 1,200 |
| 182 | 150 |
| 184 | 2,200 |
| 208 | 12,000 |
| 210 | 5,000 |
| 211 | 2,700 |
| 212 | 2,200 |
| 214 | 1,500 |
| 216 | 560 |
| 220 | 2,700 |
| 222 | 3,900 |
| 226 | 1,800 |
| 228 | 5,600 |
| 230 | 1,000 |
| 238 | 2,700 |

*Capacitors*

| Reference character: | | Capacitance |
|---|---|---|
| 54 | microfarad (mf.) | 1.0 |
| 78 | mf | 15 |
| 79 | mf | 0.1 |
| 86 | mf | 15 |
| 126 | micromicrofarads (mmf.) | 270 |
| 132 | mmf | 2.2 |
| 144 | mf | 1.0 |
| 154 | mf | 15 |
| 160 | mmf | 2.2 |
| 164 | mf | 1.0 |
| 172 | mf | 1.0 |
| 180 | mmf | 2.2 |
| 186 | mf | 1.0 |
| 200 | mf | 1.0 |
| 224 | mmf | 82 |
| 234 | mmf | 470 |

Various modifications, alternative constructions and equivalents may be employed without departing from the true spirit and scope of the invention, as defined in the following claims and exemplified in the foregoing description.

I claim:

1. A peak detector for producing sharp pulses coinciding precisely with the rounded peaks of input signals, comprising rectifying means for rectifying the input signals so that the peaks will be of one polarity, said rectifying means including a pair of diodes and a pair of transistors, said diodes being connected in opposite polarity to said transistors, respectively, and the outputs of said transistors being coupled by a common load resistor, and further including means for balancing the outputs of said transistors, zero clipping means for receiving the rectified signals from said rectifying means and for clipping the lower voltage portions of said rectified signals to produce clipped signals corresponding to the top portions of said peaks, differentiating means for receiving and differentiating said clipped signals, the differentiated signals having polarity reversals corresponding to said peaks, limiting means for generating signals of substantially square wave form corresponding to said differentiated signals, said limiting means including a high gain amplifier having transistors that continuously operate in their linear range by means of limiting diodes symmetrically connected across the circuit of said amplifier, said signals of square wave form having polarity reversals corresponding to said polarity reversals of said differentiated signals, and trigger means, having adjustment means for varying the point on said square wave form at which said trigger means operates, generating sharp output pulses corresponding precisely in time to said peaks of said input signal.

2. A peak detector for producing output pulses corresponding in time with the peaks of rounded input signals, comprising:

clipping means for removing the low amplitude portion of the input signals;

differentiating means for receiving the signals from said clipping means and providing differentiated signals having polarity reversals corresponding accurately to the peaks of the input signals;

limiting and amplifying means symmetrically limiting the differentiated signals from said differentiating means to a minor signal portion closely above and below the polarity reversals and providing high linear voltage amplification of this minor signal portion, said limiting and amplifying means including diode means limiting both the positive and negative swings of the differentiated signal by an equal amount above and below the polarity reversals, and trigger means triggered by the output of said limiting and amplifying means for producing uniform output pulses corresponding accurately in time with the peaks of the input signals.

3. The peak detector of claim 2 further comprising inverter-mixer means employing two oppositely polarity responsive amplifiers prior to said clipping means for undistorted inverting and mixing of the input signals to a common polarity.

4. The peak detector of claim 2 wherein said trigger means has an adjustment means for varying the voltage point on the signals from said limiting and amplifying means at which said trigger means is triggered.

References Cited by the Examiner

UNITED STATES PATENTS

| | | | |
|---|---|---|---|
| 2,448,718 | 9/1948 | Koulicovitch | 328—135 X |
| 2,759,052 | 8/1956 | MacDonald et al. | 307—88.5 X |
| 3,048,717 | 8/1962 | Jenkins | 307—88.5 |
| 3,073,968 | 1/1963 | Tribby | 307—88.5 |
| 3,123,776 | 3/1964 | Sharp | 328—135 X |

ARTHUR GAUSS, *Primary Examiner.*

DAVID J. GALVIN, *Examiner.*

J. JORDAN, *Assistant Examiner.*